No. 790,580. PATENTED MAY 23, 1905.
C. J. KURTZ.
PRUNE DIPPER AND SPREADER.
APPLICATION FILED JAN. 11, 1904.
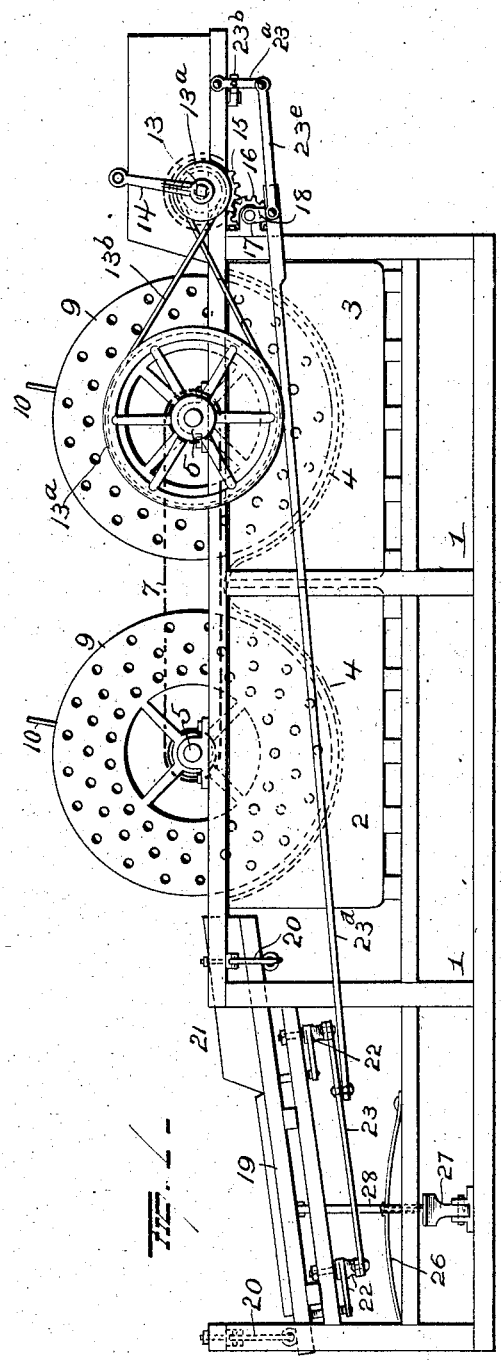
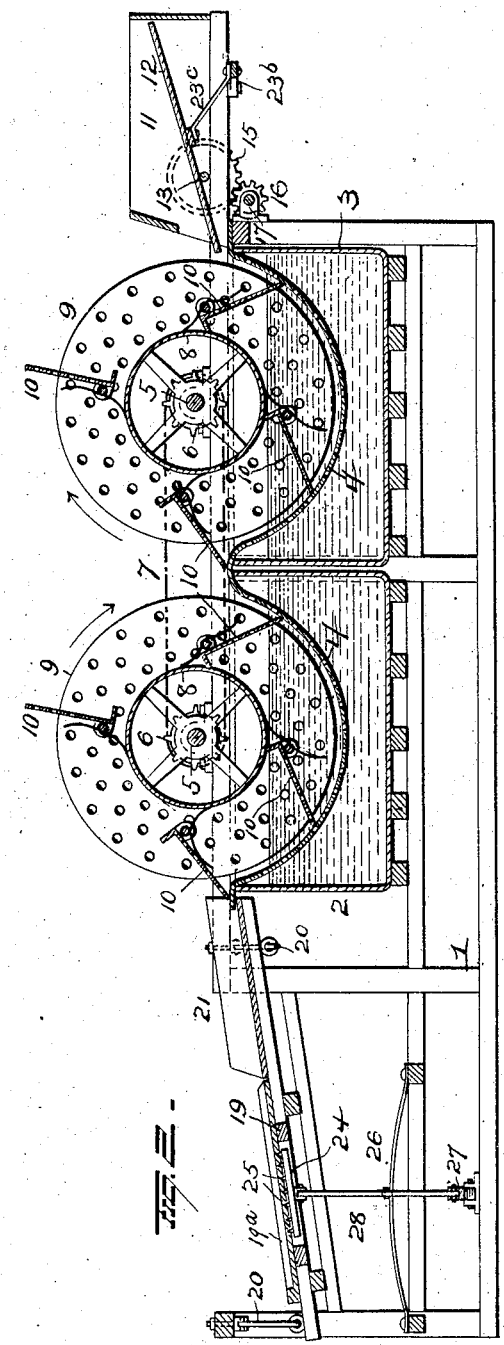
WITNESSES
INVENTOR
Attorney No. 790,580.       Patented May 23, 1905.

UNITED STATES PATENT OFFICE.

CLINTON J. KURTZ, OF SALEM, OREGON.

PRUNE DIPPER AND SPREADER.

SPECIFICATION forming part of Letters Patent No. 790,580, dated May 23, 1905.

Application filed January 11, 1904. Serial No. 188,661.

*To all whom it may concern:*

Be it known that I, CLINTON J. KURTZ, a resident of Salem, in the county of Marion and State of Oregon, have invented certain new and useful Improvements in Prune Dippers and Spreaders; and I do hereby declare the following to be a full, clear, and exact description of the invention, such as will enable others skilled in the art to which it appertains to make and use the same.

My invention relates to an improved prune dipper and spreader, the object of the invention being to provide improvements of this character which will be entirely automatic in operation and pass the prunes through baths of cleaning liquid and feed them uniformly onto trays; and it consists in certain novel features of construction and combinations and arrangements of parts, as will be more fully hereinafter described, and pointed out in the claims.

In the accompanying drawings, Figure 1 is a view in side elevation illustrating my improvements, and Fig. 2 is a view in longitudinal section.

1 represents a frame supporting side by side two tanks 2 and 3, having therein perforated semicylindrical platforms 4, submerged in the liquid in said tanks. Above tanks 2 and 3 the frame 1 supports shafts 5, having sprocket-wheels 6 thereon, connected by a sprocket-chain 7, and on said shafts hollow cylinders 8 are secured and are made with perforated disk-like enlarged heads 9, between which L-shaped perforated blades or paddles 10 are pivotally supported and hinged at the angle thereof, for a purpose which will hereinafter appear.

At one end of frame 1 a hopper 11 is located and has an inclined bottom 12, adapted to direct prunes thereon into the first tank 3 on the semicylindrical perforated platform 4. A horizontal drive-shaft 13 is supported in hopper 11 and is driven by a crank 14 or may be driven from any desired source of power. A large gear-wheel 15 is secured on drive-shaft 13 at one end and meshes with a smaller gear 16 on a horizontal shaft 17, having a crank-arm 18 at its opposite end, and this shaft 13 and shaft 5 above tank 3 are provided with pulleys $13^a$, connected by a crossed belt $13^b$.

At the discharge end of the frame an inclined swinging frame 19 is supported on pivoted links 20, connected with main frame 1, and supports an inclined feed-chute 21, having its receiving end located beneath end of the platform 4 in tank 2, so as to receive the prunes therefrom. This pivoted frame 19 is also constructed to support a tray $19^a$, abutting against the end of feed-chute 21 to receive the prunes therefrom and on which they are conveyed to a suitable drier or other apparatus.

Bell-crank levers 22 are mounted on frame 1 and connected with the frame 19. A rod or rods 23 connect the bell-crank levers, and a pitman $23^d$ connects the rod 23 with crank-arm 18. An extension $23^e$ of said pitman is connected with a pivoted link $23^a$. The link $23^a$ is attached to a pivoted bar $23^b$, connected by a link $23^c$ with the bottom of the hopper, so that when shaft 13 is turned the bottom 12 of hopper 11 will be shaken to uniformly feed the prunes into the tank 3, and the frame 19 will be shaken to compel the prunes to be fed in a single thickness and fill the tray completely, yet prevent piling thereof.

To prevent displacement of the tray on frame 19, a vertical movable bar 24, having sharp teeth 25, is provided and normally pressed upward by a spring 26 to force the teeth 25 into the bottom of the tray and hold it on the frame 19. To release the teeth from the tray, a foot-lever 27 is pivoted to frame 1 and connected by a link 28 with the bar 24, so that by exerting a downward pressure on foot-lever 27 the teeth will be withdrawn from the tray, and the latter can be readily removed from the frame and a new one substituted therefor.

The operation of my improvements is as follows: Tank 3 is filled with water containing lye or like material, and tank 2 contains clear water to rinse or clean the prunes passing therethrough. Shaft 13 is turned to revolve shafts 5 and cylinders 8, carried thereby, and prunes are fed into tank 3 on perforated platform 4, and the prunes are conveyed through the bath by means of paddles or wings 10. As will be seen, when these wings or paddles are passing through the tank they will be prevented from pivotal movement in one direction by reason of the shorter bent or flanged portions engaging cylinder 8 and the longer member engaging platform 4 and will therefore force the prunes along the platform and off the same into tank 2, where the next series of paddles or blades will carry them through the rinsing-water onto feeding-chute 21, which latter being shaken by bell-crank levers 22 and rods will uniformly feed the cleansed prunes onto the tray on frame 19.

A great many changes might be made in the general form and arrangement of the several parts described without departing from my invention, and hence I would have it understood that I do not restrict myself to the precise details set forth, but consider myself at liberty to make such slight changes and alterations as fairly fall within the spirit and scope of my invention.

Having fully described my invention, what I claim as new, and desire to secure by Letters Patent, is—

1. The combination with a curved tank, of a perforated platform depending into said tank so as to be submerged in the liquid therein, a rotary cylinder above the platform and having disk-like enlarged ends, paddles or blades of general L shape in cross-section hinged at their angles in the disk-like ends of the cylinder, stops for said paddles or blades, said paddles or blades adapted when passing through the tank to have one edge bearing against the cylinder and the other edge against the platform holding it in shoveling position.

2. The combination with two tanks located side by side, of rotary horizontal cylinders above the tanks, enlarged perforated disk-like ends on the cylinders, paddles or blades hinged to the disk-like ends of the cylinder, semicylindrical perforated platforms in the tanks against which the paddles or blades bear to force material therethrough, a hopper adapted to direct material onto the platform in one tank, an inclined feeding-chute at the side of the other tank onto which the material after being washed is directed, and means for shaking said feed-chute and the bottom of the hopper to compel uniform delivery and uniform feed.

3. The combination with a frame, of two tanks supported side by side in said frame, horizontal shafts supported by the frame above the tanks, curved perforated platforms in said tanks, cylinders secured on the shafts above the tanks, blades or paddles connected with said cylinder and adapted to be moved along the platforms to convey material across the platforms and through the liquid in said tanks, an inclined delivery-chute onto which material from these tanks is delivered, a tray-support, means for securing a tray on the support, and means for shaking said feed-chute and tray-support to compel a uniform single-layer delivery of the material onto the trays.

4. In a prune dipper and spreader, the combination with a frame, of two tanks supported side by side in said frame, shafts supported by the frame above the tanks, cylinders secured on said shafts, curved perforated platforms in said tanks onto which the prunes are fed, blades or paddles carried by the cylinder and adapted to force the prunes across the platforms and through the liquid therein, a shaking feed-chute onto which the prunes are delivered from the last tank, and a shaking tray-support adapted to hold a tray at the delivery end of said feed-chute.

5. In a prune dipper and spreader, the combination with a frame, of two tanks supported side by side in said frame, curved perforated platforms suspended in said tanks, shafts supported by said frame above the tanks, cylinders secured on said shafts, enlarged disk-like ends secured on said cylinder, blades or paddles of general L shape in cross-section hinged at their angle in the disk-like ends, stops for said blades, and the latter adapted when moved through the tanks to have one edge bear against the cylinder and the other against the platform.

In testimony whereof I have signed this specification in the presence of two subscribing witnesses.

CLINTON J. KURTZ.

Witnesses:
A. L. WEST,
A. O. CONDIT.